(12) United States Patent
Anttila

(10) Patent No.: US 9,520,724 B2
(45) Date of Patent: Dec. 13, 2016

(54) INDUCTIVE POWER SUPPLY

(75) Inventor: Sami Anttila, Espoo (FI)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 1170 days.

(21) Appl. No.: 13/497,153

(22) PCT Filed: Sep. 22, 2010

(86) PCT No.: PCT/FI2010/050733
§ 371 (c)(1),
(2), (4) Date: Aug. 20, 2012

(87) PCT Pub. No.: WO2011/036343
PCT Pub. Date: Mar. 31, 2011

(65) Prior Publication Data
US 2012/0313448 A1    Dec. 13, 2012

(30) Foreign Application Priority Data
Sep. 22, 2009    (FI) .................................. 20095973

(51) Int. Cl.
*H01F 38/14* (2006.01)
*H02J 5/00* (2016.01)
*H02J 7/00* (2006.01)
*H02J 7/02* (2016.01)

(52) U.S. Cl.
CPC .............. *H02J 5/005* (2013.01); *H02J 7/0004* (2013.01); *H02J 7/025* (2013.01)

(58) Field of Classification Search
None
See application file for complete search history.

(56) References Cited

U.S. PATENT DOCUMENTS

| | | | |
|---|---|---|---|
| 6,057,668 A | 5/2000 | Chao | |
| 6,184,651 B1 | 2/2001 | Fernandez et al. | |
| 6,636,146 B1 | 10/2003 | Wehoski | |
| 7,382,636 B2 | 6/2008 | Baarman et al. | |
| 2005/0068019 A1 | 3/2005 | Nakamura | |

(Continued)

FOREIGN PATENT DOCUMENTS

| | | |
|---|---|---|
| DE | 29816725 U1 | 9/1998 |
| EP | 2 086 085 A1 | 8/2009 |
| WO | 0215320 A1 | 8/2001 |

OTHER PUBLICATIONS

Office Action dated Mar. 24, 2014 for Corresponding Chinese App. 201080052584.7.

(Continued)

*Primary Examiner* — Jared Fureman
*Assistant Examiner* — Aqeel Bukhari
(74) *Attorney, Agent, or Firm* — William Dippert; Laurence Greenberg; Werner Stemer (57) ABSTRACT

A method for wirelessly powering a load over an inductive link, wherein the inductive link is between a primary side and a secondary side, including transmitting a first power from the primary side to the secondary side; receiving by the primary side a modulated data signal from the secondary side; demodulating the received data signal; determining, based on the demodulated data signal, whether to transmit power to the load; and transmitting, based on the determination, power to the load of the secondary side over the inductive link.

18 Claims, 5 Drawing Sheets

(56) References Cited

U.S. PATENT DOCUMENTS

| | | | |
|---|---|---|---|
| 2007/0182367 A1 | 8/2007 | Partovi | |
| 2007/0216392 A1 | 9/2007 | Stevens | |
| 2008/0197802 A1 | 8/2008 | Onishi et al. | |
| 2008/0211455 A1 | 9/2008 | Park et al. | |
| 2008/0231120 A1 | 9/2008 | Jin | |
| 2009/0033280 A1 | 2/2009 | Choi et al. | |
| 2009/0108805 A1 | 4/2009 | Liu et al. | |
| 2009/0133942 A1 | 5/2009 | Iisaka et al. | |
| 2009/0175060 A1 | 7/2009 | Onishi | |
| 2009/0302800 A1* | 12/2009 | Shiozaki et al. | 320/108 |
| 2011/0164471 A1* | 7/2011 | Baarman et al. | 368/10 |

OTHER PUBLICATIONS

European Search report dated Jan. 28, 2014 for Corresponding European App. 10818465.6.
International Search Report issued in International Application No. PCT/FI2010/050733 dated Feb. 7, 2011.
Written Opinion issued in International Application No. PCT/FI2010/050733 dated Feb. 7, 2011.
Search Report issued in Finnish Application No. 20095973 dated May 4, 2010 (with translation).

\* cited by examiner

INDUCTIVE POWER SUPPLY

FIELD OF THE INVENTION

The present invention relates to power supplies and more particularly inductive power supplies.

BACKGROUND OF THE INVENTION

In inductive power supplies, an output voltage must be controlled such that it is suitable for loading an apparatus. In this control the output voltage is kept constant although a load changes. Normally the output voltage is controlled by a separate voltage regulator e.g. by a buck chopper (a buck voltage converter) or a boost chopper (a boost voltage converter) depending on an application. However, these kinds of inductive power supplies have low coupling or loose coupling capability meaning that a loading of a secondary side does not affect on the function of a primary side or does affect only slightly. Moreover, an efficiency ratio or a coefficient of a performance, and a total power or a total efficiency is usually on a relative low level in these power supplies with the low coupling. Thus, the use of separate voltage regulators reduces the total efficient coefficient of the apparatus, and the input power cannot be regulated in an efficient manner in relation to the requirements of the load.

In high coupling (or strongly coupled) inductive power supplies an input current depends strongly on the loading of the secondary side. In these power supplies Q-values of used resonators are high and power transfers to the secondary side with good efficiency ratio, although coils in the secondary side were away from each other. If a position of a secondary coil changes, also the coupling factor changes. This means that the efficiency ratio and the maximum efficiency to the secondary side changes leading to the fact that a feeding of dynamical loads in strongly coupled inductive power supplies is difficult. While it must be ensured that enough power can be transferred to the secondary side, the output voltage must be regulated by the separate voltage regulator similarly as with the case of low coupled power supplies.

The regulation of the output voltage with the separate voltage regulator does not only increase power losses, but also requires a lot of space from the circuit board of the secondary side. Moreover, the output power of the primary side cannot be controlled in an efficient manner with relation to the loading of the secondary side, and the efficiency ratio decreases remarkably.

Due to these facts the usage of separate voltage regulators is expensive and inefficient, because receivers need to produce high powers, while being small at the same time.

If data of the output voltage of the secondary side could be transferred to the primary side, it was not necessary to use the separate voltage regulator on the secondary side. In this case the input power could be controlled or regulated based on the requirement of the load increasing the efficiency of the power supply. In prior art solutions a separate radio link is used for this purpose, for implementing the voltage feedback in inductive power supplies. However, a voltage feedback coupling on a radio frequency has also its problems. Separate radio circuits must be implemented both in the primary side and in the secondary side. These additional circuits need space from the circuit board. Furthermore, if the primary side consists of many transmitting coils, the location of the receiver on a loading surface cannot be easily located on a radio connection.

The document U.S. Pat. No. 6,184,651 describes contactless battery charger with wireless control link. In it charging energy is transferred across an inductive coupler to charge a battery or a portable device. The system comprises an inductive coupler, a controller and a communication controller, a wireless RF receiver and a wireless RF transmitter, two secondary devices, and a sensing device.

The document U.S. Pat. No. 7,382,636 describes a system and method for powering a load. In it the power supply for inductively powering a remote device has an inverter operating on an operating frequency and a primary coil. A phase comparator compares the phase of the voltage or current delivered by the power supply. If the phase relationship detected by the comparator is unacceptable, the inverter is disabled. After a period of time, the inverter is re-enabled, and the phase relationship is again determined.

BRIEF DESCRIPTION OF THE INVENTION

An object of the present invention is thus to provide a method and an apparatus for implementing the method so as to overcome the above problems. The objects of the invention are achieved by a method and an arrangement, which are characterized by what is stated in the independent claims. The preferred embodiments of the invention are disclosed in the dependent claims.

The invention is based on the idea of transmitting data of the output voltage and/or of the output current from a secondary side to a primary side through an inductive power link to regulate the output of an inductive power supply.

An advantage of the method and arrangement of the invention is that the system for controlling the output voltage does not require separate voltage regulators, efficiency can be optimized and external transmitting circuits for voltage feedback are not needed.

BRIEF DESCRIPTION OF THE DRAWINGS

In the following the invention will be described in greater detail by means of preferred embodiments with reference to the attached drawings, in which.

DETAILED DESCRIPTION OF THE INVENTION

In the invention and its embodiments, means for detecting an element and means for transferring energy to the element is described. The element which is to be detected and/or charged can be e.g. a mobile apparatus locating on a loading surface. Thus the described primary element or side or the described transmitting element or side can be e.g. a loading or charging element e.g. a table or a table capable for charging or an element locating in or on the table or being connectable to the table and the described secondary element or side or the described receiving element or side or recipient can be e.g. a mobile phone or another element or an element locating in or on the mobile phone or being connectable to the mobile phone e.g. an adapter.

The invention and its embodiments use an LSK modulation (Load Shift Keying) and a series resonator in order to find out change(s) occurring in the load and to switch or transmit correct amount of power from the primary side to the secondary side. When the secondary side and the primary side are tuned in series mode, the efficiency of the apparatus is good. Then also the LSK modulation works properly. If the secondary side and the primary side are tuned alternatively in parallel mode, this changes the functioning of the load modulation, and the load seen by the generator is different than in the case of series tuned system. In a series resonator system the change of a load, e.g. putting the mobile phone on the loading surface or taking the mobile phone away from the surface, can easily be monitored and/or detected e.g. by measuring the voltage over a resonator capacitor in the primary side and filtering the voltage by a filter, e.g. by an envelope filter. The filter can be e.g. any low pass filter and there exists many different types of envelope filters. The envelope filter can be e.g. a diode after which a resonator and capacitor is connected in parallel.

By using the LSK modulation for a voltage feedback in inductive voltage feedbacks from the secondary side to the primary side, the power transmitted by the primary side to the secondary side can be optimized. This increases a DC to DC efficiency coefficient of an inductive power supply remarkably. An LSK communication can be used in load detection, because all elements that couple to the primary side in inductive manner are not meant to be charged by the system, and the power source is not switched on for these not allowable items. In addition, if there exists many transmission coils in the power supply, it is easy to locate the coil of the secondary side on a load base, on a load frame or on a load bed, and only the necessary transmission coils can be switched on.

The power source can be inductive meaning that the transmitted energy from the primary side transfers to the secondary side via one or more inductive links. The power source can also be controlled meaning that depending on the load or charging situation or charging needs of the secondary side, more or less power or no power at all can be transmitted to one or more receiving apparatuses.

The impedance of the series resonator as a function of a frequency is $$Z = R + j\omega L + \frac{1}{j\omega C} = R + j\left(\omega L - \frac{1}{\omega C}\right) = R + jX \quad (1)$$

At the resonance frequency the sum of reactive components is zero making the impedance of the resonator resistive. In the equation 1, Z describes the total impedance of the resonator, R is a resistive part, L is an inductive part, C is a capacitive part and X is the reactive part of the impedance. $\omega$ is the angular frequency of the resonance.

Figure 1:
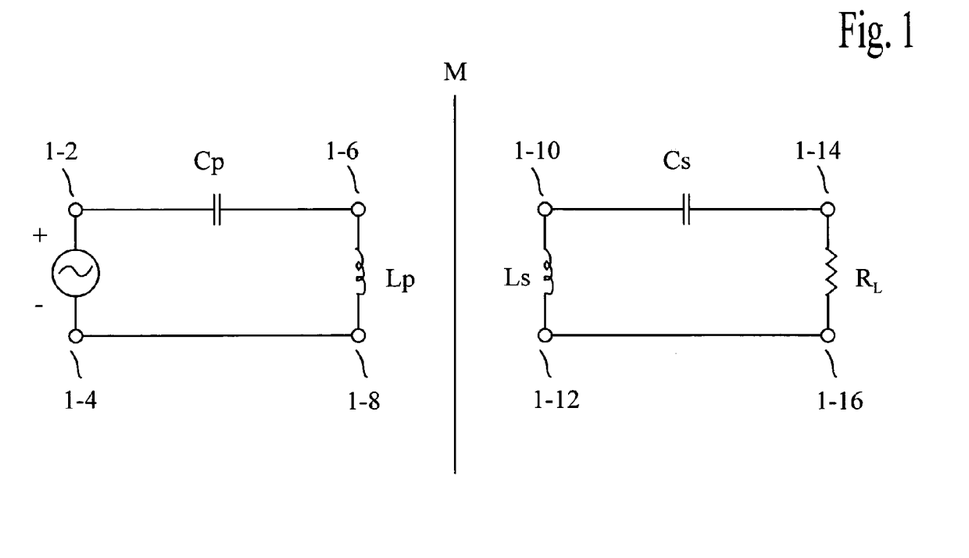
FIG. 1 shows a series tuned inductive power supply.

FIG. 1 shows a series tuned inductive power supply. The primary side has a power supply or a signal generator between the nodes 1-2 and 1-4 feeding power to the primary capacitor Cp between the nodes 1-2 and 1-6. The primary coil Lp is located between the nodes 1-6 and 1-8. The secondary coil Ls locating in the secondary side between the nodes 1-10 and 1-12 receives energy from the primary coil when the primary resonator of the primary coil and the primary resistance resonate, when the secondary side is inductively coupled to the primary side. The secondary capacitor Cs is located between the nodes 1-10 and 1-14. The receiving apparatus being marked by a load resistor Rl is located between the nodes 1-14 and 1-16. The nodes 1-4 and 1-8 and the nodes 1-12 and 1-16 are connected together.

A transfer inductance M between the primary coil and the secondary coil shows the strength of the primary side and the secondary side magnetic coupling. In other words, the impedance of the secondary side reflects to the primary side due to the influence of the transfer inductance or the mutual impedance M.

When the inductive system comprises two series resonators, the impedance Zr of the primary side reflected from the secondary side can be described by the equation (2).

$$Z_r = \frac{\omega^2 M^2}{Z_S} = \frac{\omega^2 M^2}{j\omega L_S + \frac{1}{j\omega C_S} + R_L} \quad (2)$$

In the equation (2), $\omega$ is the angular frequency, M is the transfer inductance, Zs is the secondary side impedance, Cs is the secondary side capacitor impedance, capacitance, Ls is the secondary side inductance and RL is the secondary side load resistance. Because at the resonant frequency, the sum of the reactive components is zero, the total load Zp seen by the primary side at the resonance frequency is (the combination of the equations (1) and (2)), $$Z_P = R_P + Z_R = R_P + \frac{\omega^2 M^2}{R_L} \quad (3)$$

wherein M is the transfer inductance, Zp is the primary side impedance, Rp is the primary side resistance, Zr is the impedance of the primary side reflected from the secondary side, RL or Rs is the secondary side load resistance, and $\omega$ is the angular frequency.

The magnitude of the feed current depends now at the resonance frequency both on the series resistance of the primary side and on the reflected impedance.

$$I_i = \frac{U_i}{Z_p} = \frac{U_i}{R_P + \frac{\omega^2 M^2}{R_L}} \quad (4)$$

In the equation (4) Ii is the input current, Ui is the input voltage and Zp is the primary side impedance. The peak voltage Uc,max over the primary side capacitor of the series resonator depends on the input current.

$$U_{C,max} = \frac{1}{\omega C} I_i \quad (5)$$

Figure 2:
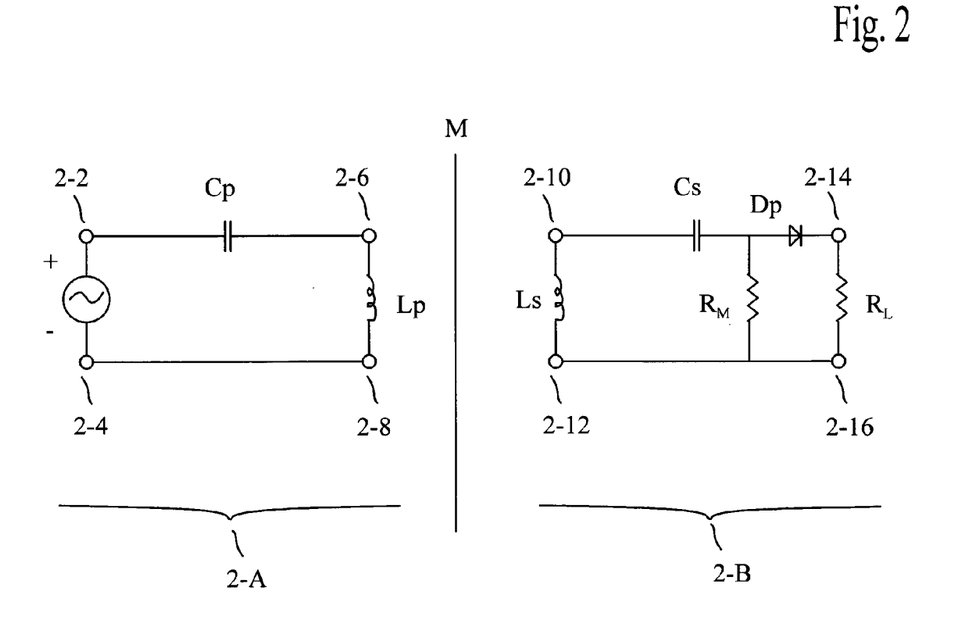
FIG. 2 shows a series resonator system with a secondary side in which a modulation resistance is coupled parallel to a load resistor.

FIG. 2 shows the series resonator system according to the invention and its embodiments. In the secondary side 2-B a modulation resistance is coupled parallel to the load resistance. The primary side 2-A of FIG. 2 has the power supply or the signal generator between the nodes 2-2 and 2-4 feeding power to the primary capacitor Cp between the nodes 2-2 and 2-6. The primary coil Lp is located between the nodes 2-6 and 2-8 and resonates or transfers the energy to the secondary side inductor and also receives energy from the secondary side inductor. The nodes 2-8 and 2-4 are connected together. The secondary coil Ls locating in the secondary side between the nodes 2-10 and 2-12 receives energy from the primary coil. The secondary capacitor Cs is located between the nodes 2-10 and 2-14, and the load resistor Rl is located between the nodes 2-14 and 2-16. The modulating resistor Rm is located in parallel with the load resistor, i.e. between the nodes 2-14 and 2-16.

The purpose for the modulating resistor is to shift the loading condition in order to transfer data of the secondary said over the inductive power link. The nodes 2-16 and 2-12 in the secondary side are connected together.

In FIG. 2 (and in FIG. 5) there can also exist a diode DP in forward connection between the resistors Rm and RL. This is for the case that if a switch of the secondary side becomes conductive, the loading the load element is not discharged via the resistor Rm, but the diode protects the load element RL e.g. the battery.

There exists also other ways to couple the resonator, e.g. in parallel mode. Then the reflecting impedance is different to what is presented, but the load modulation can be sensed over the capacitor of the transmitter end. The voltage change can however be smaller than in the case of series mode apparatus.

When this another resistance Rm is connected parallel to the load resistance, the total impedance seen by the primary side has the form:

$$Z_p = R_p + \frac{\omega^2 M^2}{\frac{R_s R_M}{R_s + R_M}} = R_p + \frac{\omega^2 M^2 (R_s + R_M)}{R_s R_M} \quad (6)$$

In the equation (6) Rs or Rl is the load resistor and Rm is a modulation resistor, which is connected in parallel with the load resistor. When the input voltage of the primary side and a pulse ratio of a rectifier stay constant, but the impedance of the load changes, also the load current changes according to the Ohm's law. The effect of the modulation resistor on the primary side's input current can be obtained by combining the equations (4) and (6).

$$I_i = \frac{U_i}{R_p + \frac{\omega^2 M^2}{\frac{R_s R_M}{R_s + R_M}}} = \frac{U_i}{R_p + \frac{\omega^2 M^2 (R_s + R_M)}{R_s R_M}} \quad (7)$$

The decrease of the load resistance causes the decrease of input current, because the impedance of the secondary side reflects to the primary side inversely proportionally. The decrease of the load resistance can be a result from the mobile apparatus being taken away from the loading surface or if many mobile apparatuses existed on the surface, at least some of them being taken away from the loading surface.

The change of the load current can now be detected by measuring a voltage over the resonator capacitor of the primary side. The following equation (8) can be obtained when the dependency of the current on the load resistor and modulation resistor in equation (7) is combined with the equation (5) of the peak voltage of the capacitor.

$$U_{C,max} = \frac{U_i}{\omega C_p \left( R_p + \frac{\omega^2 M^2 (R_s + R_M)}{R_s R_M} \right)} \quad (8)$$

When the peak voltage Uc,max of the capacitor with and without the modulation resistor is known, the magnitude of the voltage change seen in the primary side can be calculated. The change of voltage depends on the transfer inductance M and the value of the modulation resistor. If the transfer inductance M is large, a smaller load change can be detected. With a small transfer inductance M, the importance of modulation resistor increases. It can also be seen from the equation (8) that when a modulation resistance is in parallel with the load resistance, the resistance decreases and the voltage increases.

Figure 3:
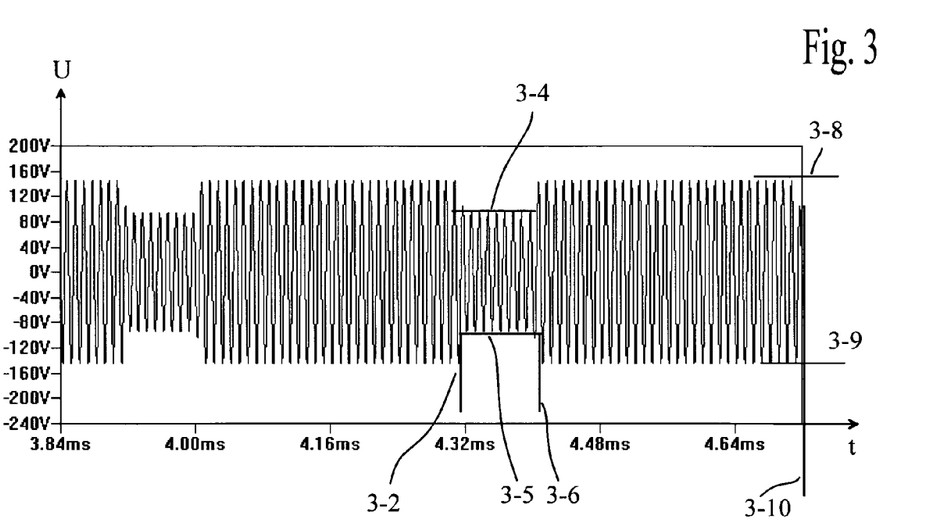
FIG. 3 shows a voltage over a resonator capacitor in the primary side.

FIG. 3 shows a voltage over the resonator capacitor in the primary side. The x-axis is a time axis with some figures in milliseconds and the y-axis is a voltage axis with some figures in voltage. The load of the secondary side is modulated causing an amplitude modulated signal into a carrier frequency. The modulation signal can be separated from the carrier signal by an envelope detector and the original signal can be reconstructed.

The original signal is the signal to the transistor T3 (FIG. 5) of the secondary side. Without a modulation the peak voltage of the capacitor seen in the primary side is constant or nearly constant. When the transistor T3 is controlled with a data signal, the signal presented in FIG. 3 can be seen in the primary side. The control signal of the transistor T3 can be outputted from the envelope filter, which can be interpreted as data.

It is now possible to code data or information on the output voltage to the signal making it possible to regulate or control the input power of the primary side to an optimum level in relation to the secondary side's load. The LSK modulation is modulation for a load change and is based on the change of load impedance, in other words what is the effect when changing the load resistance Rm+RL.

In FIG. 3, between a time interval 3-6 and 3-2, the voltage over the resonating capacitor in the primary side can be between a first level 3-4 (e.g. about +100V) and a second level 3-5 (e.g. about −100V). Between a second time interval 3-10 and 3-6, the voltage can be between a third level 3-8 (e.g. about +140V) and a fourth level 3-9 (e.g. about −140V). In one embodiment, if no apparatus is detected, the curve of FIG. 3 runs at its upper levels. If a not allowable device is detected e.g. a metal element, the curve of FIG. 3 runs at its lower levels.

The use of the LSK modulation increases the power consumption of the secondary side because output current also flows though the modulator resistor RM when the transistor T3 is turned on. If the output voltage is constant, the power increase to the secondary side provided by the LSK modulation is as stated in the equation (9).

$$P = \frac{U_o^2 D^2}{R_m} \quad (9)$$

In the equation (9) Uo is the output voltage, D is the pulse ratio of the LSK modulation and Rm is the value of the modulation resistor. If the pulse ratio is kept narrow, the power consumed by the LSK modulation is on a low level. If e.g. the output voltage is 5V and the modulation resistor is 47 ohm and the pulse ratio is 10%, the power consumption caused by the LSK modulation is 5.3 mW.

Figure 4:
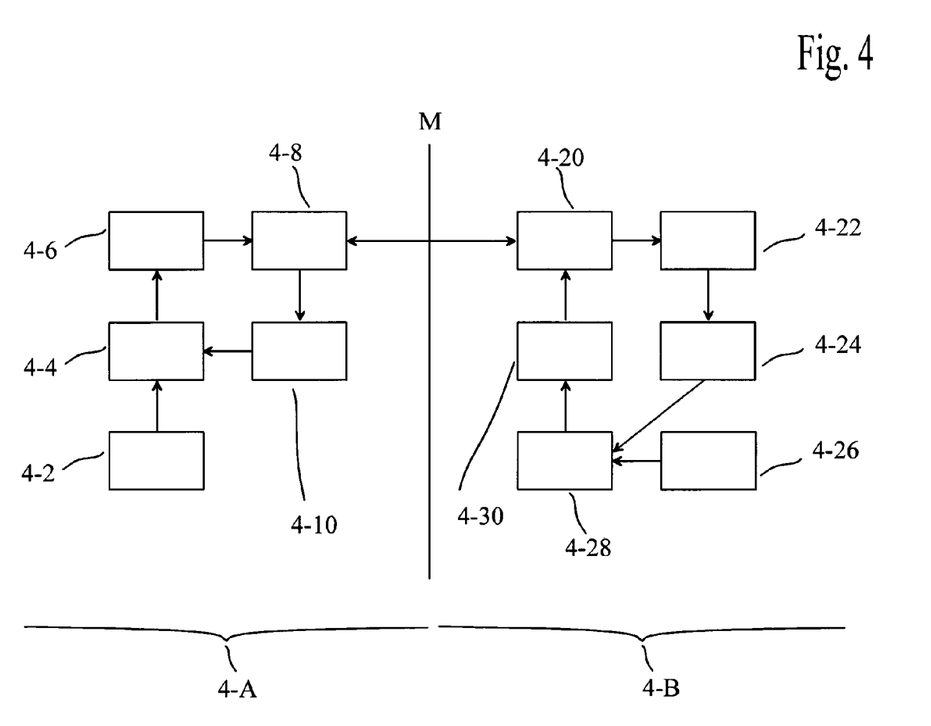
FIG. 4 shows a block diagram of an inductive power source based on the LSK modulation regulation according to the invention and its embodiments.

FIG. 4 shows a block diagram of the inductive power source based on the LSK modulation regulation and the series resonator system according to the invention and its embodiments. The primary side 4-A comprises a power stage 4-6, which can be e.g. a rectifier or a signal generator. The rectifier or the signal generator drives power to the primary resonator 4-8. The controller circuit 4-4 measures the input current of the primary side and interprets or decodes data from the envelope detector 4-10. It also regulates the pulse ratio of the power stage according to the output power data from the secondary side 4-B. The power signal, which transfers to the secondary side resonator 4-20, is rectified 4-22 in the secondary side so that it can load the battery of the mobile or a non-mobile apparatus. The microcontroller 4-28 of the secondary side measures 4-24 the output voltage over the load apparatus or only measures the output voltage and output current 4-26 fed to the load apparatus, and transmits data and/or information to the primary side with the help of LSK modulation 4-30. As mentioned above, the change of the load, caused e.g. by entering the mobile phone on the table, can be detected by measuring the output voltage over the resonance capacitor of the secondary side, transmitting data to the primary side, receiving said data in the primary side, filtering the voltage by a filter, e.g. by the envelope filter and controlling the input voltage of the primary side. The control can be such that the voltage fed to the secondary side is enough to load the load apparatus.

The element 4-2 of FIG. 4 can measure the primary side's current. When the output voltage is known and the output current is measured, the maximum output power with a first value of the input current can be calculated. The maximum output power can also be calculated with a second input current and so on and thus a database of output powers with certain input currents and with certain load resistances can be formed. In a hazard or in a failure situation, e.g. if there exists a load's short circuit current, the maximum output power can be controlled such the fed power to the secondary side and to the load is not increased but decreased and that the apparatus to be loaded is not destructed.

Figure 5:
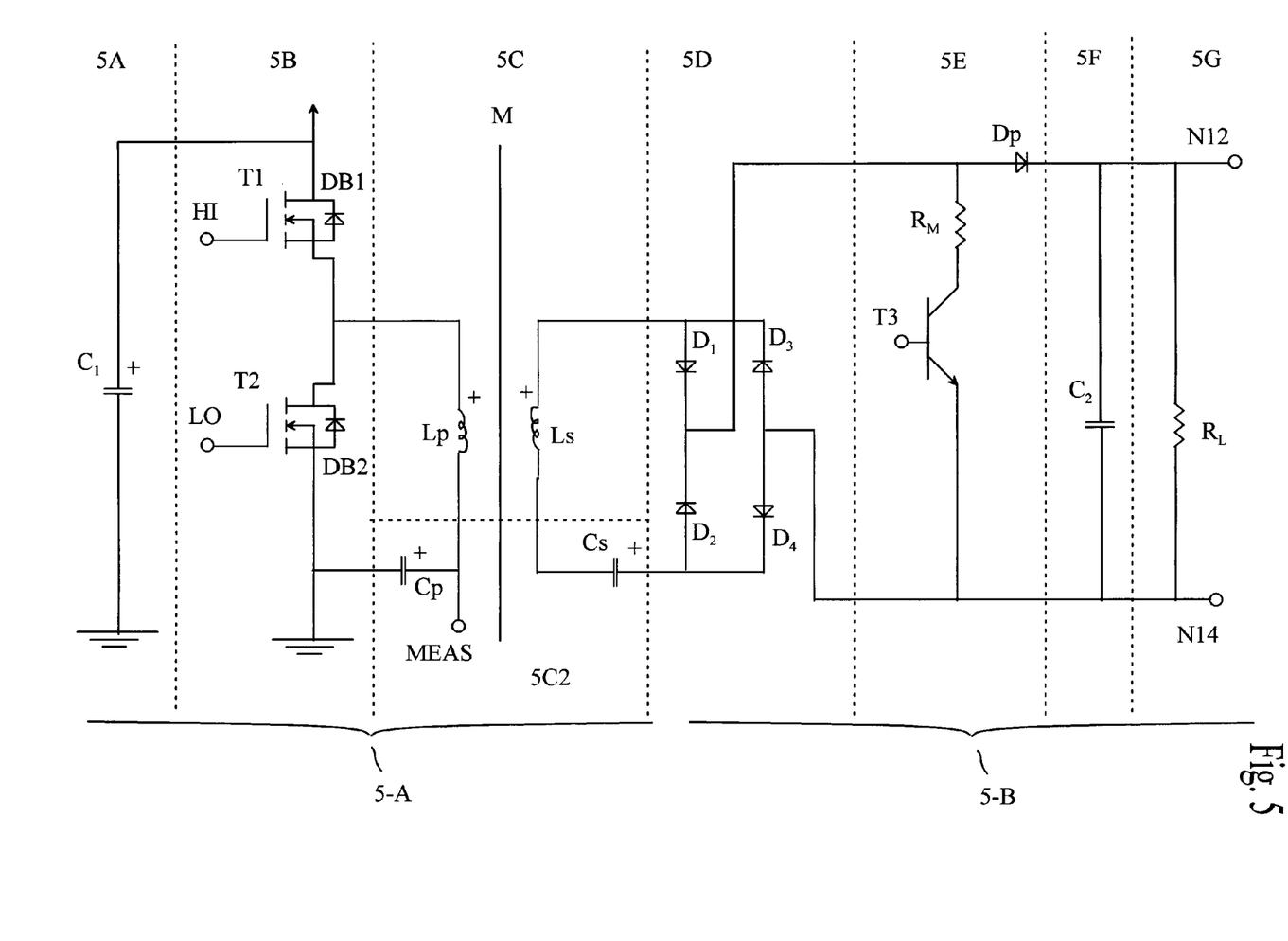
FIG. 5 shows an implementation of the invention and its embodiments.

The block diagram of the system and method of the invention and its embodiments can be implemented in several ways. FIG. 5 shows one possible implementation with seven blocks 5A . . . 5G. The blocks or stages are of the primary side 5-A and of the secondary side 5-B and are described in the following:

The block 5A describes an energy storing element e.g. a capacitor C1 for storing energy from the power source of the system. The stage 5B is a signal generator stage. It comprises a first transistor T1 and a second transistor T2. Both transistors can be e.g. CMOS (complementary metal oxide semiconductor) transistors, but they can also be BJTs (bipolar junction transistors). Alternatively, any switch can be used for implementing the transistors T1 and T2 and for producing a switching effect. In one embodiment the transistor T1 can be a MOSFET (metal oxide semiconductor field effect transistor) transistor and the transistor T2 can be IGBT (insulated gate bipolar transistor) transistor. In one embodiment these switches or transistors are of the same type, but they can also be of the different type. The signal generator in the stage 5B can be any signal generator producing a rectangular wave. This produces a good efficiency ratio. Also a sine signal can be used. Then a power supply can be very efficient and only few interference signals appear. The generator can be e.g. sine signal generator in totem pole circuit of T1 and T2 and between the nodes 1-2 and 1-4 in FIG. 1 and between the nodes 2-2 and 2-4 in FIG. 2.

The diodes DB1 and DB2 are connected between the drain and the source electrodes of each transistors and are for freewheeling purpose, allowing the current to flow from source to drain. These can thus be called as parasitic current diodes. If e.g. the upper switch is in cut-off state, the current try to continue. Because the switch is in its off state, the current must flow through the lower diode. This coupling protects semiconductor switches from overvoltage situations, purposes. A first voltage, e.g. a high voltage HI, can be connected to the gate of T1 for controlling the upper switch. A second voltage, e.g. a low voltage LO, can be connected to the gate of T2 for controlling the lower switch. The drain of T1 can be connected to the power supply voltage and the source of T2 can be connected to the ground voltage. Depending on the types of switches to both of the transistors of the half bridge will be given the same control signal. The switches are of the different types N and P but the switches can also be of the same type, usually the type N. The base control signals can be inverted.

The elements 5C and 5C2 forms the induction system of series resonators exhibiting resonance at the resonance frequency of the system. The block 5C shows said inductors and the block 5C2 shows said capacitors. The mutual inductance M in said blocks describes the strength of magnetic power from the primary side to the secondary side and vice versa. The resonator can be of a dielectric type or a magnetic type. In FIG. 5 the magnetic type is shown. In the primary side the inductor Lp and the capacitor Cp forms the first series resonator and in the secondary side the inductor Ls and the capacitor Cs form the second series resonator. The secondary side's resonator is connected in series. The inductor receives the power from the primary side and the capacitor forms the other component in this series resonator system.

In block 5C2 the point MEAS can be measured. This point measures the voltage over the capacitor Cp reflecting the change of the output, change in the output load, voltage of the secondary side. The measured voltage change can be due to the change of the load of the secondary side.

The stage 5D is a rectifier circuit comprising four diodes D1, D2, D3 and D4, or a rectifier bridge. The rectifier circuit rectifies the current, i.e. converts the alternating current AC to direct current DC, which alternating current is from the primary side resonator conveyed via the magnetic field to the secondary side resonator and which then rectified in stage 5D.

The capacitor of the stage 5F can also belong to the previous rectifier stage. The capacitor C2 holds the supply voltage on a certain data voltage level, because otherwise the output voltage would be full wave sine signal or half wave sine signal. The output direct voltage from the stages 5D and 5F is then suitable for loading the apparatus or the load or the battery or the accumulator of the apparatus. In one embodiment, the stages 5E and 5F are as shown in FIG. 5, where the capacitor C2 is after the back diode such that the capacitor C2 cannot discharge, when the switch T3 is on its on-state. In another embodiment the stage 5F with the capacitor C2 is before the stage 5E.

In the secondary side the modulation resistor Rm can be switched in parallel to the load resistor Rl of the secondary side with the help of another switching element e.g. the switching transistor T3. The transistor can be controlled with the microcontroller of the secondary side (not shown in FIG. 5). The stage 5E can thus be said to be the output stage comprising the modulation resistor Rm and the transistor T3 as the switch. The collector of T3 is connected to the modulation resistor Rm and the emitter of T3 is connected to the node N14. To the base electrode of T3 can be applied a voltage, which can control the current flow through T3 and thus connecting the modulation resistor Rm parallel to the load resistor.

The stage 5G is the load stage, which in FIG. 5 comprises the resistor Rl. Its resistance corresponds to the resistance of the apparatus on the loading surface.

In the method of the invention, the microcontroller 4-28 sends data to the LSK modulation block, LSK modulator 4-30. The LSK modulation block 4-30, 5E can comprise the resistor Rm and the switch element T3 or a transistor and a capacitance to vary the impedance. In FIG. 5 T3 is an NPN (negative positive negative) bipolar transistor. When the switch is on, the resistor Rm can be seen in parallel with the resistor RL. Thus the value of the combined resistance is less than the value of RL only, but the resistance value seen by the primary side increases, because it's value is inversely proportional to the resistance value of the primary side. Since a larger load now affects on the primary side, there also exists a voltage drop over the primary side capacitor Cp in peak to peak voltage. This can be seen e.g. in FIG. 3 in the lower voltage range between the points 3-6 and 3-2. With the help of the switch, the microcontroller controls the square wave to the values one and zero. These data values can be transmitted in series mode or in parallel mode from the secondary side to the primary side. The data can be demodulated by a LSK demodulator in the primary side, and this and other changes in voltages can be seen in the envelope detector 4-10 (FIG. 4).

In other words, the pulses generated and decoded by the LSK modulator 4-30 are first transmitted or reflected to the secondary resonator 4-20 and then resonated or reflected back to the primary side, the resistor switch combination of the LSK modulator reflects to the primary side. The envelope detector 4-10 receives the pulses and encodes data from said pulses, e.g. voltage pulses.

An A/D (analog to digital) converter of the LSK modulator takes samples from the analog voltage and/or current signal, quantizes the samples and codes them into a digital, e.g. a binary signal. The A/D converter reads the analog I/O signal produced by the envelope filter into a digital format, which is then interpreted by the processor. In other words, it encodes the data.

The output voltage, which can be measured in step 4-24 is the voltage over the load resistor RL (the stage 5G) and the output current, which can be measured in step 4-26, is the current through the resistor RL. These measured values can be fed to the microcontroller 4-28. The measured output voltage and/or the measured output current can be compared in the microcontroller with one or more reference values. If the output voltage is larger than the reference value, it means that power transmitted by the primary side must be lowered. On the other hand, if the output voltage is lower than the same or another reference value, it means that power transmitted by the primary side must be increased.

Figure 6:
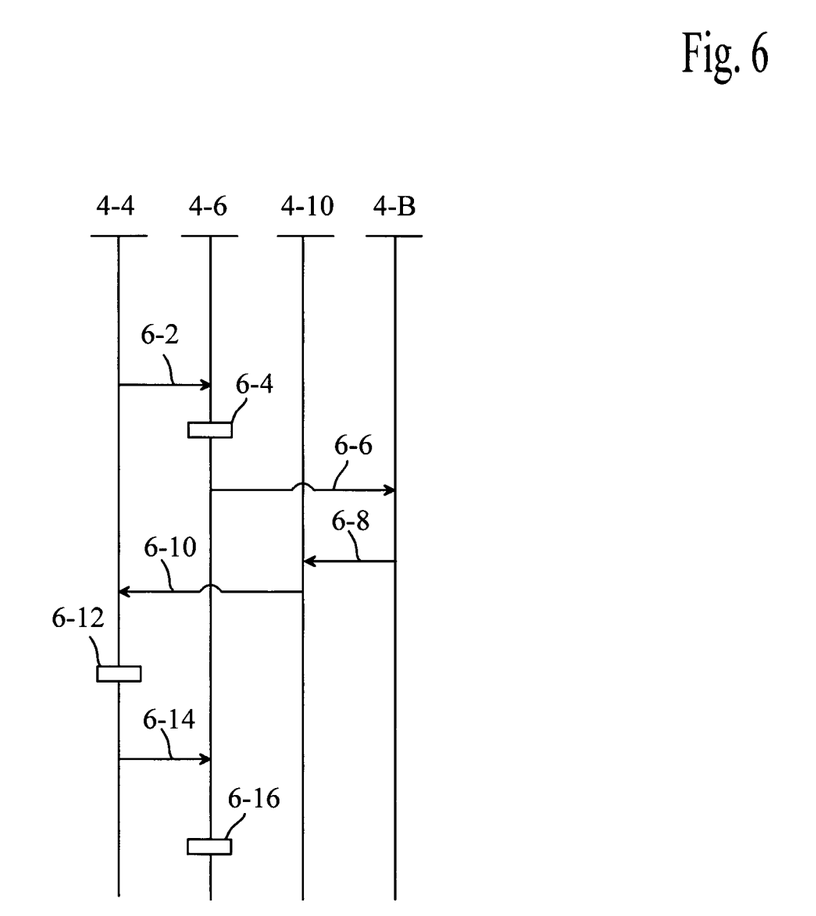
FIG. 6 shows a method for detecting an apparatus according to the invention and its embodiments.
Figure 7:
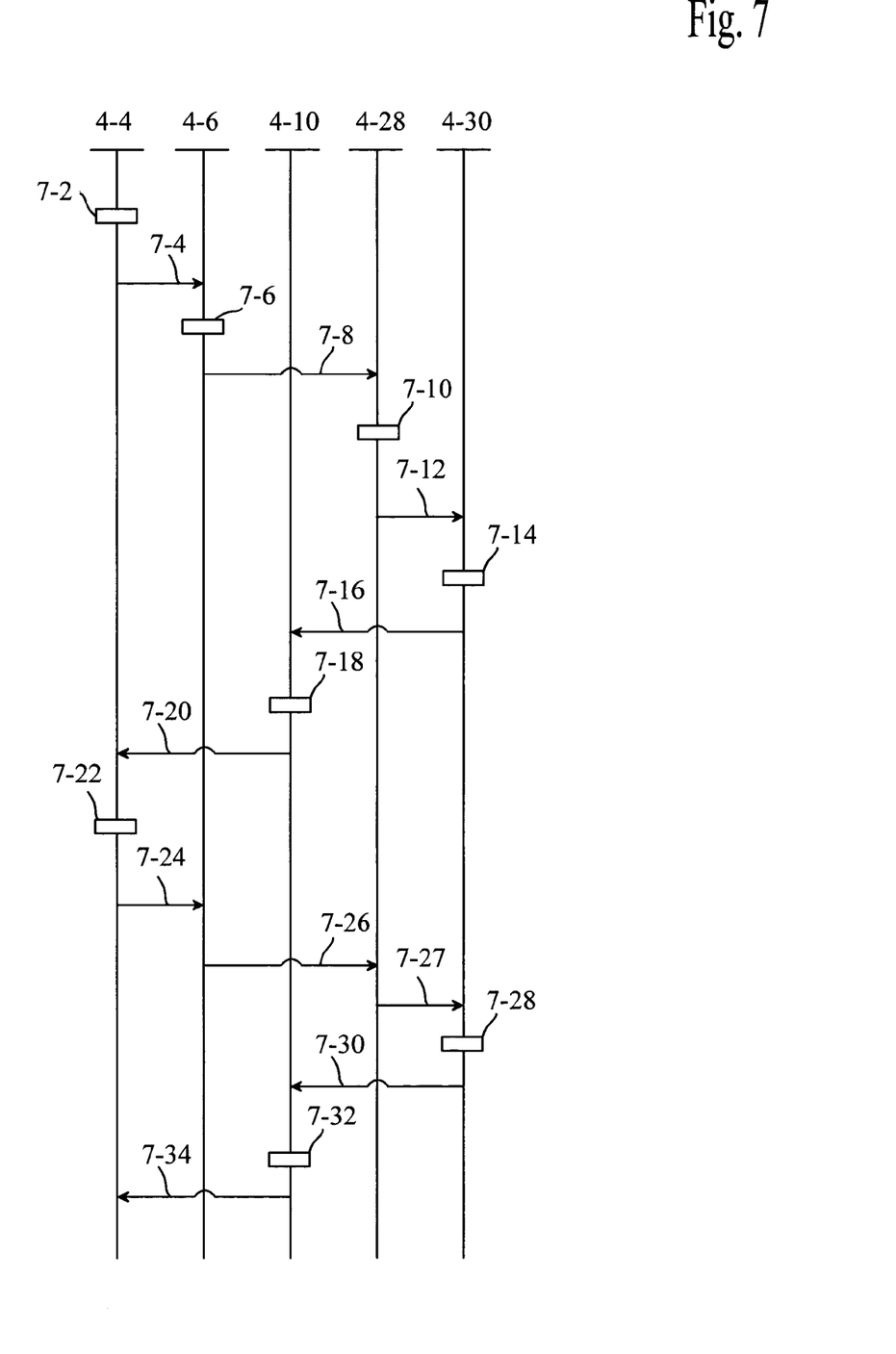
FIG. 7 shows a method for loading an apparatus according to the invention and its embodiments.

The method of the invention and its embodiments can be divided into four phases. In the first step no receiving apparatus is detected. In the second step the receiving apparatus is detected. In the third step the receiving apparatus is loaded and in the fourth step no receiving apparatus is detected anymore. FIG. 6 shows a method for detecting an apparatus according to the invention and its embodiments and FIG. 7 shows a method for loading an apparatus according to the invention and its embodiments.

When there is no receiving apparatus detected, the controller 4-4 switches the gain stage 4-6 on every now and then, occasionally or at intervals or in response to a triggering event. The controller thus sends (phase 6-2 in FIG. 6) a message or a communication to the gain stage, which causes the gain stage to be turned on (phase 6-4 in FIG. 6). The primary side resonator starts working and resonates (phase 6-6 in FIG. 6) magnetic energy to the secondary side 4-B. This magnetic energy comprises a low power carrier signal, a first power signal. When there exists no recipient or no correct recipient on the secondary side, no return signal or no correct return signal is transmitted from the secondary side and received by the primary side. In other words, the envelope detector or the envelope filter 4-10 screens the signal or communication from the primary side resonator caused by the effects of the recipient in the secondary side through the envelope signal and possibly receives (phase 6-8 in FIG. 6) a return signal or communication from the secondary side. The envelope detector can forward (phase 6-10 in FIG. 6) the sensed or screened data to the controller for it to detect whether there is a suitable recipient in the secondary side. If no signal is found or the signal has incompatible form some or all of the elements of the primary side can become idle for a predetermined time or for a random time or the controller can be turned off for a predetermined period (phase 6-12 in FIG. 6). After that the screening or sounding is repeated or re-enabled by first sending the message to the controller (phase 6-14 in FIG. 6), and the controller receiving the message and in response to said message turning the power on (phase 6-16 in FIG. 6).

The primary side can transmit power continuously or only during predetermined periods. Moreover the transmitted power can be low, but enough to wake a possible and an allowable microcontroller 4-28 of the secondary side alive. This means that when enough power is fed to the secondary side, and the correct microcontroller is found, the microcontroller will sent a handshake burst to the primary side and then it will start to send data back to the primary side. The receiver or the secondary side can alternatively or in addition send data or information to the primary side at intervals or periodically although the output voltage is OK. This means that although it were not necessary to increase or decrease the transmit power, the receiver can anyway send data or information, e.g. the signal STATUS OK back to the primary side.

The power signal from the primary side tries to invoke the microcontroller of the secondary side. When a power feedable apparatus or the adapter is found, this invocation occurs, and the microcontroller starts modulating the carrier signal first for making the handshaking. The need for power can be defined also along with this handshaking communication between the secondary side and the primary side or it can be communicated separately, e.g. afterwards after the handshaking operation e.g. by modulating the carrier signal or adding power control bits to the communication. It is also possible to send continuously information on the power need.

When the apparatus has been recognized with the first power signal, power can be fed to the apparatus with a second power signal, which can have a higher value than the first power signal. The feeding of power can be continued with this second powering level until e.g. enough power has been fed. Alternatively, the level of power can be increased or decreased e.g. according to the power needs of the apparatus or based on the temperature measurements made in the secondary side.

The primary side can transmit power or a signal comprising power continuously or only during predetermined periods over the inductive link. The secondary side can receive e.g. by a second receiver power or a signal comprising power continuously or only during predetermined periods over the inductive link.

The secondary side can continuously or during predetermined periods transmit over the inductive link the load modulated carrier signal and/or information on output power data to the primary side. The primary side can continuously or during predetermined periods receive e.g. by a first receiver over the inductive link the load modulated carrier signal and/or information on output power data to the primary side.

Only the information on the output power data or the information on the output power data together with other information can be used for continuously controlling the feeding of power from the primary side to the secondary side. In other words, the transmitted power and/or the power transmittance can be controlled or regulated continuously or continuous time on the basis of the output power data or information and possibly on other information, too.

A primary resonator in the primary side can be used for transmitting the first power over said inductive link to the apparatus via the secondary side, wherein the first power is controlled continuously or on during predetermined periods on the basis of the output power data of the secondary side and possibly also on the basis of other information.

A secondary resonator in the secondary side can be used for transmitting over the inductive link the load modulated carrier signal and/or information on output power data to the primary side.

Moreover, the first power signal transmitted from the primary side to the secondary side over said inductive link can be increased if more power is needed, and decreased if less power is needed.

As stated above, the power stage 4-6 can also be the signal generator, which feds the primary side series resonator, i.e. the series inductor and capacitor, which resonator then produces or invokes the magnetic field. If no recipient is detected the magnetic fields transmits to an empty space. If some signal is found from the secondary side, the envelope detector detects this and starts to measure the change of the magnetic field.

When the signal generator feeds power to the primary side series resonator, the voltage over the primary side capacitor is measured. If the peak-to-peak voltage has a high or a maximum value, the secondary side is empty. If the secondary side apparatus is found or switched to the magnetic field, the measured peak-to-peak voltage decreases. The voltage changes when the load resistor RL is switched to the secondary side.

Furthermore, the decrease of the voltage does not have to be waited, because also the communication or the communication bits from the secondary side can be detected. In this handshaking situation a certain number of bits or just the correct bits are detected. The controller 4-4 can read the output of the envelope detector as e.g. binary bits, ones and zeroes or other data and if e.g. only zeroes are found, no secondary side apparatus is present. Thus the combination of the communication bits or a used data protocol and the voltage or either one of those can be used for detecting whether the recipient is found from the secondary side.

When the apparatus exists in the secondary side, it can cause the return signal to be modulated such that the envelope filter can demodulate or decode the first message or the return signal or the handshaking data from the secondary side and forward this demodulated signal or the handshaking signal to the controller 4-4. The final decoding occurs when the signal of the envelope detector is read into a numerical, e.g. into a digital format. The controller can detect or decide (phase 7-2 in FIG. 7) from this demodulated signal that the existing apparatus is an allowable one. The envelope detector produces the same square wave than what is fed to the base of the switch transistor in the secondary side. This square wave is then interpreted as the sequence of ones and zeroes by the controller. After that the controller can send (phase 7-4 in FIG. 7) a communication to the signal generator to turn the power transmittance on. The signal generator can receive the signal or the message from the controller, and the power is switched on (phase 7-6 in FIG. 7). This causes the energy to flow via the magnetic field to the secondary side and to the microcontroller (phase 7-8 in FIG. 7) causing the microcontroller of the adapter to activate.

The microcontroller of the adapter or the mobile apparatus sends (phase 7-10 in FIG. 7) a command to the LSK modulator to modulate the resonated signal. The LSK modulator receives the command (phase 7-12 in FIG. 7) and modulates the signal by at least one modulation variable. It can be e.g. the amplitude or the frequency. The modulated signal is transmitted to the primary side (phase 7-16 in FIG. 7). The envelope filter receives said signal and demodulates it (phase 7-18 in FIG. 7). The transmitted signal, which is sent back, comprises a sequence of ones and zeroes, which are interpreted as data. After this the demodulated signal is transmitted to controller (phase 7-20 in FIG. 7), which can read (phase 7-22 in FIG. 7) from the received data that the apparatus is a correct and allowable apparatus, or the need for power or more power, or time for loading or other data or information. The controller can then send (phase 7-24 in FIG. 7) a command to the signal generator to still feed the power to the secondary side or to increase the power or decrease the power. The signal generator then sends the power to the apparatus or adjusts the power and then sends this adjusted power to the apparatus. As stated above, the apparatus can receive (phase 7-26 in FIG. 7) the transmitted power and forward (phase 7-27 in FIG. 7) a modulation command to the LSK modulator for it to modulate (phase 7-28 in FIG. 7) the data signal. The signal it then again transmitted to the primary side, in which the envelope detector receives (phase 7-30 in FIG. 7) the signal, demodulates (phase 7-32 in FIG. 7) it, and feeds (phase 7-34 in FIG. 7) the data signal to the controller such that in response to the data signal the controller can make a decision form the next move.

This can be repeated as a loop until a stop command is received or until the apparatus is taken away from the loading surface or until a predetermined has lapsed or until a triggering event or until a hazard situation occurs. When no load or no allowable load exists any more, the current of the output is low. It is then known that no load exists in the secondary side, and the power feed can be stopped.

When the secondary side receives current the output voltage and current can be measured. This measured value can be transmitted to the primary side or the value of the output voltage or current can be compared to one or more predetermined value(s) and then the comparison result can be transmitted to the primary side. The primary side thus obtains information on e.g. the power need of the secondary side can then send more or less power to the secondary side. The measurement of the output current can also define the maximum output power that can be fed to the secondary side.

One embodiment of the system of the invention comprises a monitoring and detection system, a controlling system for controlling the output voltage, system for data transmitting and receiving by using e.g. the LSK modulation, system for modulation of power signal, using of the inductive link, and using of the power signal as a payload signal and as a carrier signal.

In the power feeding situation, the power that is fed to the apparatus can be as constant as possible until the apparatus has been charged or the power can first have a lower value and then a higher value or it can have more than two different values.

When the apparatus need power or need more or less power, the secondary side can send this need to the primary side. According to the need the pulse ratio can be changed, and when the pulse ratio of the power stage is changed, the total power to be sent is changed.

In other words, the secondary side performs the handshaking operation and sends bits to the primary side. The controller of the primary side detects the communication and decides that the recipient of the secondary side, e.g. the adapter of the mobile phone is correct for the system or it is recognized or it can be charged if needed. After that the primary side can start feeding power to the secondary side. The secondary side resonator receives magnetic power from the primary side series resonator and forwards this AC current to the rectifier circuit 4-22. This component transforms the AC current into the DC current and feeds the converted current to the load element.

The component 4-24 measures output voltage and the component 4-26 measures the output current. These elements belong to the controlling part of the system. It is important to measure the output voltage such that it can be compared to a predetermined value. If the output voltage is higher than a first threshold value or a reference value, the controller circuit can give a power down command to the signal generator such that the recipient apparatus does not overload. On the other hand, if the output voltage is lower than a first or a second threshold value the controller circuit can give a power up command to the signal generator such that the recipient apparatus obtains enough power to be loaded. The measurement of the output current can give a value for the output power for preventing a load short circuit.

Also other quantities can be measured. These include e.g. temperature of the recipient apparatus for preventing the temperature of the accumulator of the apparatus not increasing too high.

All kind of information and data can be transferred over the link. The protocol is freely selectable. Adding new parameters does not change the situation. The information and data can be e.g. data on the change of load or output voltage and data on the load recognition as data signal.

The invention and its embodiments describes a method, a first element, a second element, a system, a computer program and a computer program product for wirelessly powering from a primary side an apparatus in a secondary side over an inductive link between the primary side and the secondary side. They comprise a receiver or means for receiving over the inductive link in the primary side from the secondary side a modulated data signal; a demodulator or means for demodulating the received modulated data signal; a controller or means for determining, based on the demodulated data signal comprising information on the change of the load of the secondary side, whether or not to transmit power to the apparatus; and a transmitter or means for transmitting a first power over said inductive link to the apparatus via the secondary side. Said means for transmitting can comprise a power stage and/or a primary resonator.

The apparatus and or the secondary side residing e.g. in the apparatus can first be recognized. This can happen e.g. by sending the invoking power to the secondary side, invoking the microcontroller in the secondary side, causing the secondary side to transmit a handshaking signal to the primary side and recognising said signal and thus the secondary side and/or the apparatus. When the apparatus has been recognized, the need for power can be determined.

In other words, when the apparatus has been placed on a loading surface or a loading domain, it can be first recognized. This can happen by transmitting invoking power from the primary side to the secondary side before loading power is transmitted to the secondary side. The invoking power can be lower than the first power, and the transmittance of the invoking power from the primary side to the secondary side can occur occasionally or after a predetermined period or based on a triggering event.

After the secondary side has been recognized, the primary side needs to know, how much power can be fed to the secondary side and to the apparatus or how much power is needed. Thus after recognition or in parallel to it or even before the recognition, information on the need for power of the apparatus can be send from the secondary side and received by the primary side. If no power need information is available, a pilot power can be send from the primary side to the apparatus for testing, if this power can be used even in the next steps.

The secondary side can transmit to the primary side a separate power need signal, or a power up command or a power down command or power need signal with a specific figure of the needed power. The primary side can feed power to the secondary side in increasing steps, in decreasing steps, in alternating steps or in constant steps. If more power is needed the first power can be increased or if less power is needed the first power can be decreased. How to transmit power and how much power can be transmitted to the apparatus can be based at least partly on the information received from the secondary side. The needed power and/or the already fed power can be compared to one or more threshold values and based on said comparison(s) the power fed can be controlled. The threshold values can be fixed or floating depending on the parameters of the primary side, the secondary side or the apparatus. The measurements made e.g. in the secondary side can effect the threshold values.

The transmitting of power from the primary side to the secondary side can comprise at least in two steps: firstly transmitting an invoking power at a first power level for invoking the secondary side and for receiving, by the primary side, recognition information on the apparatus in response to said invoking; and after the apparatus has been recognized by the primary side secondly transmitting power at a second power level for powering the apparatus via the secondary side according to its need for power. The power transmitting can be continued to the secondary side, until the apparatus has been loaded.

The change of an impedance of the secondary side caused by switching a modulating resistor in parallel to the impedance of the apparatus and/or the secondary side and/or the adapter can be monitored by the primary side over a resonator capacitor. After that the monitored change of the impedance of the secondary side can be interpreted by the primary side as a data signal. Before sending the data signal to the primary side, in the secondary side, said data signal is modulated such that a modulation resistor is connected in parallel with the load in accordance with an output voltage or current measurement over the load or through the load causing the amplitude of the carrier signal to change. This modulated data signal is then received in the primary side as mentioned above, and demodulated and processed further and/or read.

Transmitting the first power from the primary side to the secondary side can be turned off, if no more power is needed, or if no more power can be fed to the apparatus, or if a hazard situation has occurred in the apparatus or if no modulated data signal is received from the secondary side. This means that if the apparatus sends a message to the primary side that it needs no more power, although more power could be send to the apparatus, the feed for power can be interrupted. The controller can also make the decision to stop feeding the power to the apparatus, if the apparatus has been fully loaded or if a hazard or an error situation has occurred, or if the apparatus has been e.g. taken away from the loading domain.

Increasing or decreasing the invoking power or the first power can occur by changing the pulse ratio of a power stage in the primary side feeding power to the secondary side.

Seen from the secondary side a method for wirelessly powering from a primary side an apparatus in a secondary side or connected to the secondary side or being in communication with the secondary side over an inductive link between the primary side and the secondary side can comprise the steps of receiving over the inductive link in the secondary side from the primary side a carrier signal, which can contain power or which can be used as power signal or which is the power; feeding the received power to the apparatus; measuring a current through a load of the apparatus or a voltage over the load of the apparatus, said current or voltage being caused by said received power; switching a modulating resistor on in parallel to the load of the apparatus at least partly in response to said current measurement or said voltage measurement; modulating an amplitude of the received carrier signal in response to said load switching; and transmitting over an inductive link the load modulated carrier signal to the primary side.

Said receiver element comprises e.g. a receiver or receiving means for receiving over the inductive link in the secondary side from the primary side (2-B, 4-B, 5-B) a carrier signal containing power; a rectifier for feeding the received power to the apparatus; measurement means for measuring a current through a load of the apparatus or a voltage over the load of the apparatus, said current or voltage being stimulated by said received power; a switch or switching means for switching a modulating resistor on in parallel to the load of the apparatus at least partly in response to said current measurement or said voltage measurement; a modulator or modulating means for modulating an amplitude of the received carrier signal in response to said load switching; and a secondary resonator or means for transmitting over an inductive link the load modulated carrier signal to the primary side. The secondary side can be in the apparatus e.g. such that the secondary side is fully or partly integrated to the apparatus or as discrete components. The apparatus then comprises said secondary side means or devices.

The means of the invention and its embodiments can be means for performing any steps of a method of the invention or its embodiments.

The element(s) can also comprise means for performing any steps of a method of the invention or its embodiments.

A system for wirelessly powering from a primary side an apparatus in a secondary side over an inductive link between the primary side (2-A, 4-A, 5-A) and the secondary side (2-B, 4-B, 5-B) can comprise one or more transmitting elements and one or more receiving elements.

The computer program or the computer program product can comprise program code means adapted to perform any one of the steps of the invention and its embodiments, when the program is run on a computer or on a processor.

The invention and its embodiments provide many advantages. The load shift keying LSK modulation can be used to send data over an inductive link. The LSK modulation is based on a detection of the changes of a secondary load. The change of the load can easily be detected e.g. for implementing a voltage feedback. At the same time the coefficient of efficiency of the power supply becomes better and the structure of the secondary side becomes simpler when compared to the prior art structures of systems using a separate voltage regulator or a radio link. With the help of the LSK modulation also the load detection can be made. This can prevent the switching-on of the power supply to the primary side due to the influence of the inductive coupling elements.

The LSK circuit of the secondary side uses only few components thus being inexpensive to implement. It also requires a small amount of space from the circuit board of the secondary side.

It can be noted that one primary side corresponds to one secondary side and they are for one mobile apparatus. Thus if e.g. five mobile apparatus each using different type of an adapter or different type of receiving elements is to be detected or detected and loaded, five systems presented in FIG. 5 must be implemented. As stated above, the LSK modulation can be used for implementing the voltage feedback over the inductive link. The load recognition can be implemented and ensure that the inductive coupling load is with the transmitter. The voltage feedback also makes the inductive power supply independent and no separate voltage regulator is necessary for the regulation of the output voltage.

Also some disadvantages of the previously used prior art inductive power sources can now be avoided. Separate output power regulators, which decrease total coefficient of efficiency leading to the situation, in which the primary power cannot be controlled in an efficient manner in relation to the power needs of the secondary side, can now be avoided. Also the feedback implemented with a radio link and the radio link does are not have to be used, because it/they require(s) a lot of space from the secondary side. Also the location of the secondary side can now accurately be determined.

The invention and its embodiments describe communication over an inductive link and how to detect the apparatus on the conductive surface, how to detect the change of the load of the primary-secondary system and how to transmit data over the inductive link and feed power optimally to the apparatus. The idea is to use the series type resonator, which has a good ratio of efficiency for transferring energy from the primary side to the secondary side and LSK type modulation for communication of information on the load apparatus from secondary side to the primary side.

It will be obvious to a person skilled in the art that, as the technology advances, the inventive concept can be implemented in various ways. The invention and its embodiments are not limited to the examples described above but may vary within the scope of the claims.

The invention claimed is:

1. A method for wirelessly powering, from a primary side, an apparatus in a secondary side over an inductive link between the primary side and the secondary side, comprising:
   performing, by the primary side, a first detection of the secondary side apparatus;
   performing, by the primary side, a second detection comprising a handshaking operation between the primary side and the secondary side;
   transmitting power, by the primary side, to the secondary side apparatus;
   receiving, by the primary side, a modulated data signal from the secondary side;
   demodulating, by the primary side, the modulated data signal; and
   receiving, by the primary side from the secondary side, a command to perform any action selected from the group consisting of increasing power level, decreasing power level, stopping powering, and continuing powering.

2. The method according to claim 1, wherein the data signal further comprises information on the need for power of the secondary side apparatus.

3. The method according to claim 1, wherein the step of performing the second detection further comprises transmitting invoking power from the primary side to the secondary side when no power is transmitted to the secondary side.

4. The method according to claim 3, wherein the invoking power is transmitted at a first power level lower than a second power level for powering the apparatus.

5. The method according to claim 1, further comprising transmitting, by said primary side, invoking power in response to a triggering event.

6. The method according to claim 1, further comprising:
   increasing, by the power stage, the power level if more power is needed; and
   decreasing, by the power stage, the power level if less power is needed.

7. The method according to claim 1, further comprising turning off transmitting power, by the power side, if no modulated data signal is received from the secondary side.

8. The method according to claim 1, further comprising adjusting, by the primary side, the power level by changing the pulse ratio of the power stage in the primary side.

9. The method according to claim 1, wherein the step of receiving a modulated data signal comprises
   measuring, by said primary side, a voltage over a resonator capacitor in the primary said; and
   converting, by said primary side, measured voltage into a modulated data signal.

10. A method for wirelessly powering, from a primary side, an apparatus in a secondary side over an inductive link between the primary side and the secondary side, comprising:
    triggering, by said secondary side, a first detection of the secondary side apparatus in a primary side apparatus;
    responding, by said secondary side, to a handshaking operation from the primary side;
    receiving, by said secondary side, over the inductive link in the secondary side from the primary side a carrier signal containing power;
    measuring, by said secondary side, a current through a load of the apparatus or a voltage over the load of the apparatus, said current or voltage being stimulated by said received power; and
    switching, by said secondary side, a modulating resistor at least partly in response to said current measurement or said voltage measurement,
    such that a modulated carrier signal is receivable by the primary side, over said inductive link, the modulated carrier signal providing ongoing information pertaining to output power at the secondary side.

11. A primary side device for wirelessly powering an apparatus in a secondary side over an inductive link between the primary side and the secondary side, wherein the device comprises:
    a detection system for performing a first detection of the secondary side apparatus and a second detection for performing a handshaking operation;
    a signal receiver for receiving a modulated data signal from the secondary side apparatus;
    a demodulator for demodulating the modulated data signal;
    a controller for selecting, based on the demodulated data signal, any command from the group consisting of increase power level, decrease power level, stop powering, and continue powering; and
    a power stage for transmitting power over said inductive link to the secondary side apparatus.

12. A secondary side device for wirelessly receiving power from a primary side over an inductive link between the primary side and the secondary side device, wherein the device comprises:
    a signal receiver for triggering a handshaking operation between the primary side and the secondary side;
    a power receiver for receiving over the inductive link in the secondary side from the primary side a carrier signal containing power;
    a rectifier for rectifying the received power to a secondary side apparatus;
    a modulating resistor for modulating an amplitude of the received carrier signal;
    a modulator switch for switching the modulating resistor at least partly in response to said current measurement or said voltage measurement; and
    a secondary side microcontroller operable to measure output current through a load of the secondary side apparatus or a voltage over the load of the secondary side apparatus and further operation to control said modulator switch thereby generating a modulated carrier signal receivable by the primary side over the inductive link, the modulated carrier signal providing ongoing information pertaining to output power at the secondary side.

13. The device of claim 12, wherein the secondary side device is incorporated into the secondary side apparatus.

14. A system for wirelessly powering from a primary side an apparatus in a secondary side over an inductive link between the primary side and the secondary side, wherein the system comprises a secondary side device according to claim 12 and a primary side device comprising:
    a detection system for performing a first detection of the secondary side apparatus and a second detection for performing a handshaking operation;
    a signal receiver for receiving a modulated data signal from the secondary side apparatus;
    a demodulator for demodulating the modulated data signal;

a controller for selecting, based on the demodulated data signal, any command from the group consisting of increase power level, decrease power level, stop powering, and continue powering; and a power stage for transmitting power over said inductive link to the secondary side apparatus.

15. An element for wirelessly powering from a primary side an apparatus in a secondary side over an inductive link between the primary side and the secondary side, wherein the element comprises means for performing a method according to claim 1.

16. The method of claim 1, wherein performing said handshake operation comprises:

sending, by said primary side, a magnetic energy communication; and receiving, by said primary side, a return signal from said secondary side apparatus.

17. The method according to claim 1, further comprising turning off transmitting power, by said primary side, if a stop powering command is sent.

18. The method of claim 1, wherein said modulated data signal comprises information pertaining to power required by the secondary side apparatus.

* * * * *